May 3, 1938.  S. MINNECI ET AL  2,116,403
STEP REGULATOR
Filed Jan. 21, 1937
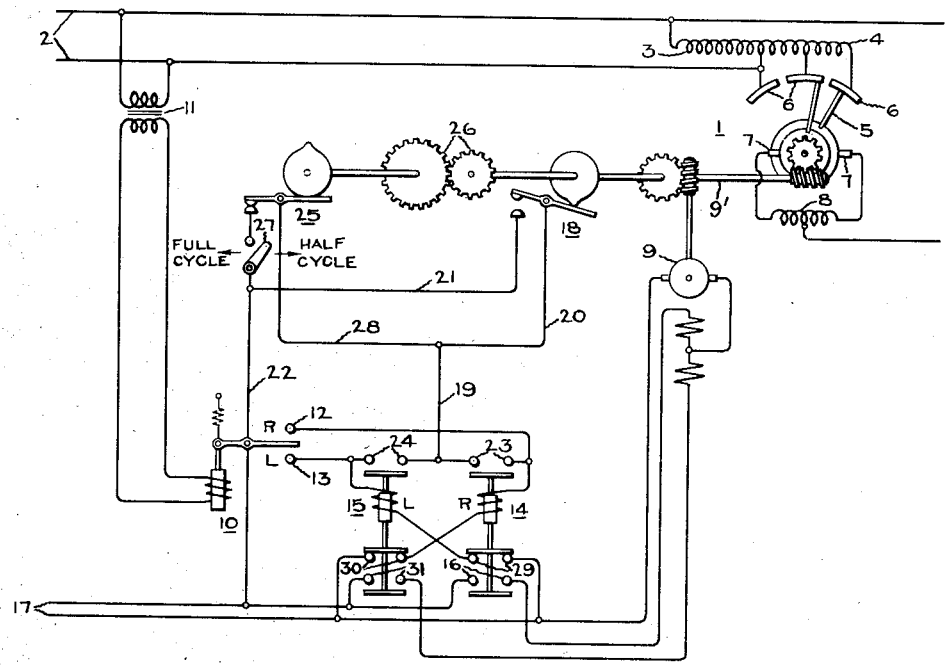
Inventors:
Salvatore Minneci,
Louis F. Blume,
by Harry E. Dunham
Their Attorney.

Patented May 3, 1938

2,116,403

UNITED STATES PATENT OFFICE 2,116,403

STEP REGULATOR

Salvatore Minneci and Louis F. Blume, Pittsfield, Mass., assignors to General Electric Company, a corporation of New York Application January 21, 1937, Serial No. 121,620

8 Claims. (Cl. 171—119)

Our invention relates to step regulators and more particularly to improvements in the control of step regulators.

A step regulator is a regulator in which the regulating action takes place in definite steps as contrasted with a regulator in which the regulating action takes place smoothly and in a substantially stepless manner. A well-known example of a step regulator is a transformer provided with tap-changing means for changing the transformer ratio under load. Such regulators are commonly referred to in the art as load-ratio-control transformers.

Usually each step regulator has a predetermined regulating range. For example, many load-ratio-control transformers, when used as voltage regulators, have a 10% regulating range. This means that they can introduce into the regulated circuit, in definite steps, a maximum regulating voltage of 10% of the regulated circuit voltage. Each of the steps in the regulating range of a step regulator may be referred to as an operating step. Now it is sometimes desirable to have a step regulator go through its regulating range in a number of regulating steps which is less than the number of operating steps included in its range. For example, if a step regulator is regulating the voltage of a main feeder circuit, which supplies a number of branch feeder circuits, it may be unnecessary to have the voltage of the main feeder circuit regulated very closely and all that may be necessary is that it be regulated in relatively coarse or large regulating steps. Thus, these regulating steps might include two or more of the operating steps of the regulator. In this manner, repeated operation of the relays and control elements of the regulator may be minimized. By a regulating step, we mean the complete cycle of operation a step regulator automatically goes through when it is called upon to make a change in the value of the regulated quantity or condition.

In accordance with our invention, we provide a novel and simple control circuit for a step regulator by which the number of operating steps in a regulating step can be changed quickly and easily at will. In this manner, we produce what may be described as a two-in-one regulator, in that it can be used either as a relatively "coarse" regulator having a relatively few number of regulating steps in its regulating range or it can be used as a relatively "fine" regulator having a relatively large number of regulating steps in its regulating range. Such a regulator is more versatile than ordinary step regulators. When in the form of a load-ratio-control transformer, it may be used either to control the voltage of a main feeder circuit in a relatively few number of regulating steps or to control the voltage of a branch feeder circuit in a relatively large number of steps.

An object of our invention is to provide a new and improved step regulator.

Another object of our invention is to provide a new and improved control circuit for a load-ratio-control transformer.

Our invention will be better understood from the following description taken in connection with the accompanying drawing and its scope will be pointed out in the appended claims.

Referring now to the accompanying drawing, we have shown therein diagrammatically an embodiment of our invention as applied to a load-ratio-control transformer 1 for regulating the voltage of an alternating current power circuit 2. The regulating transformer is shown by way of example as an auto-transformer having a common winding section 3 connected across the load side of the power circuit and having a series regulating section 4 connected in the power supply side of the circuit 2. Depending upon the polarity of the connections of the regulating winding 4 with respect to the voltage of the main circuit, the regulating voltage will either buck or boost the voltage of the main circuit.

For varying the regulating voltage produced by the transformer, we provide a tap-changing switch mechanism comprising a movable switch arm mechanism 5 for cooperation with a plurality of contacts 6 connected to spaced taps in the series winding 4. The switch arm 5 is of the double finger type, the two fingers being insulated from each other and being connected by means of suitable collectors or brushes 7 to the terminals of a reactor 8, the electrical mid-point of which is connected to the power supply side of the main circuit 2. In the position shown in the drawing the two fingers of the movable switch arm 5 are making a bridging connection between the middle fixed contact 6 and the right-hand fixed contact 6. The load current in the main circuit 2 therefore divides through the two halves of the reactor 8 and the two fingers of the switch arm, thereby producing a voltage which is intermediate the voltage which will be produced if the switch arm has both its fingers on either the right-hand contact 6 or the middle contact 6.

As the load current flows in opposite directions in the two halves of the reactor 8, this current produces no net magnetizing effect in the reactor. However, the voltage of the series winding between the middle and right-hand contacts 6 produces a circulating magnetizing current in the reactor 8. This current is limited by the magnetizing reactance of the reactor to a safe value.

If now the switch arm is moved either to the right or to the left, so as to have both its fingers engage either the middle contact 6 or the right-hand contact 6, there will not only be produced a change in voltage on the load side of the circuit 2, but also there will be no circulating current in the reactor 8. Hence, as the reactor is then unmagnetized its impedance will be negligible.

There is nothing new in this tap changing arrangement and it is only described in such detail in order to make clear that the tap-changing switch has two different kinds of positions. One kind, which may be described as a full-cycle position, is when both switch fingers are on the same stationary contact. The other kind, which may be described as a half-cycle position, is when the two switch fingers make a bridging connection between two adjacent fixed contacts. With the three fixed contacts shown, it follows that there are three different full-cycle positions and two different half-cycle positions intermediate the respective full-cycle positions. When the tap-changing switch member is moved throughout its range of motion from one extreme full-cycle position to the other extreme full-cycle position, the circuit voltage will be changed in four operating steps and the positions of the movable member will alternately be full-cycle and half-cycle positions.

The tap-changing switch is driven by a reversible electric motor 9 through suitable mechanical operating connections 9'.

The motor 9 is controlled automatically in response to the voltage of circuit 2 by means of a voltage sensitive control device which is shown in the form of a contact-making voltmeter 10. The voltmeter 10 is connected to respond to the voltage of circuit 2 in any suitable way and as shown it is connected thereacross through a potential transformer 11. The voltmeter 10 is provided with a set of "raise" contacts 12, which close whenever the voltage of circuit 2 falls appreciably below a predetermined normal value. This meter is also provided with a set of "lower" contacts 13 which close whenever the voltage of circuit 2 rises appreciably above its normal value.

In order to reduce the contact duty on the contact making voltmeter and also in order to facilitate sealing-in the operation of the regulator there are interposed auxiliary relays 14 and 15 between the contact-making voltmeter contacts and the motor 9. The "raise" contacts 12 control auxiliary relay 14, which is provided with a pair of normally open contacts 16 which close upon energization of the relay thereby to energize the motor 9 from a suitable source of control current 17 so as to cause this motor to rotate in one direction. Similarly, auxiliary relay 15 is controlled by "lower" contacts 13 and this relay is provided with a set of contacts 31 for energizing the motor 9 from the supply circuit 17 so as to cause this motor to rotate in the reverse direction. The current for operating the relays 14 and 15 is also derived from the supply circuit 17.

In order to prevent stopping of the tap-changing mechanism part way through a regulating step, we provide a seal-in circuit controlled by a contactor 18. Contactor 18 is cam-operated by motor 9 and is so driven that it opens its contacts upon the completion of every operating step and has its contacts closed when the switch arm is moving from a half-cycle position to a full-cycle position or from a full-cycle position to a half-cycle position. Contactor 18 is connected by means of conductors 19, 20, 21 and 22 in parallel with the contact making voltmeter contacts through separate sets of seal-in contacts 23 and 24 of the relays 14 and 15 respectively.

In order to change the number of operating steps in a regulating step, we provide a second seal-in contactor 25 which is driven by means of suitable gearing 26 at half the speed of the seal-in contactor 18. Furthermore, seal-in contactor 25 is so arranged that its contacts are closed at all times except when the movable member of the tap-changing switch is in a full-cycle position. A manually operable switch 27 is provided for selectively connecting the contactor 25 in parallel with the contactor 18 through a conductor 28.

Because of the seal-in type of control, it would be possible for the contact making voltmeter to close its "raise" or "lower" contacts thereby sealing-in one or the other of the relays 14 or 15 and if then the voltage should change in the opposite direction, the contact-making voltmeter would close its other set of contacts thereby tending to seal-in the other auxiliary relay and giving a conflicting directional control to the motor 9. This is prevented by means of interlocking contacts 29 and 30 on relays 14 and 15 respectively.

The operation of the illustrated embodiment of our invention is as follows: Assume that power is flowing through the power circuit 2 from right to left as viewed in the drawing and that the supply circuit 17 is also energized. Assume further that the series winding of the regulated transformer is so connected that it produces a voltage boost in the alternating current circuit.

The illustrated position of the contact-making voltmeter 10 indicates that the voltage of circuit 2 is substantially normal. The position of the movable member of the tap-changing switch shows that the tap-changing apparatus is within a one-half cycle position of producing maximum voltage boost.

Assume now that the voltage of circuit 2 rises sufficiently to cause the contact-making voltmeter 10 to close its "lower" contacts 13. This will complete a circuit from the upper side of the supply circuit 17 through the contacts 13, the operating winding of the relay 15, the interlock contacts 29 of the relay 14 to the other side of the supply circuit 17. Auxiliary relay 15 thereupon picks up thereby closing its contacts 31 which complete a circuit for the motor 9 through one-half of its mid-tapped series field winding. This will cause the motor 9 to rotate in such a direction as to move the switch contact fingers in a counter-clockwise direction as viewed in the drawing. As soon as the motor starts to turn, the seal-in contactor 18 closes thereby completing a seal-in circuit for auxiliary relay 15. This seal-in circuit consists of conductor 22, conductor 21, the contacts of contactor 18, conductor 20, conductor 19 and the seal-in contacts 24 of relay 15. Due to this seal-in path around the "lower" contacts 13 of the contact-making voltmeter, the motor 9 will continue to be energized if vibration or a momentary fluctuation in the voltage of the main circuit should cause the "lower" contacts 13 to separate. In other words, the seal-in contactor 18 assumes control of the operating mechanism of the regulator and keeps this control until the tap-changing switch reaches the full-cycle position in which its two contact fingers are both on the middle fixed contact 6. As soon as this half-cycle step has been completed, the contactor 18 opens.

If this tap change has changed the voltage of the circuit sufficiently to restore it to normal the parts will now come to rest. If the voltage has not been restored to normal, the contact-making voltmeter will stay closed so that the motor will keep on operating and as soon as the moving contact gets off the full-cycle position, the contactor 18 again seals-in and assumes control of the motor until the next counter-clockwise half-cycle position has been reached. This will continue in half-cycle steps until the voltage has returned to normal.

Should the voltage fall below normal sufficiently to cause the contact-making voltmeter to close its "raise" contacts 12 during operation of the motor 9 in a lowering direction nothing will happen because the interlock contact 30 on the auxiliary relay 15 will be open thereby preventing energization of the auxiliary relay 14 by the closure of the "raise" contacts 12.

If, however, the "raise" contacts 12 should close when the motor 9 is at rest and both auxiliary relays are deenergized, the relay 14 will pick up through the "raise" contacts 12 and the interlock contacts 30 on relay 15 in series. Picking up of relay 14 closes contacts 16 which energizes the motor 9 through the other half of its split series field. This reverses the direction of this motor and causes the switch contacts to move in a clockwise direction. The seal-in circuit for auxiliary relay 14 is through seal-in contacts 23 and the contactor 18, in parallel with the "raise" contacts 12. The operation will now be the same as for voltage lowering except that the motor is turning in the reverse direction and the switch contacts are moving clockwise instead of counter-clockwise. This action will continue in half-cycle steps until the voltage returns to normal and the contact-making voltmeter balances in its open position. Interlock contacts 29 on relay 14 prevent operation of the auxiliary relay 15 whenever the motor is operating in a raising direction.

Although only three fixed contacts are provided on the series winding 4, it will be obvious to those skilled in the art that the number of these contacts may be increased to practically any number desired.

If now it is desired to convert the regulator into one having the same regulating range but half the number of regulating steps, it is only necessary to close the switch 27. As previously mentioned, the closure of this switch connects the contactor 25 in parallel with the contactor 18. As the contactor 25 does not open on half-cycle positions of the tap-changing mechanism, it is immaterial whether or not the contactor 18 opens at this time because the seal-in circuit for the relays 14 and 15 will be completed through the seal-in contactor 25. Each regulating step will now constitute a movement of the tap-changing mechanism from one full-cycle position to the next and there can be no stopping on half-cycle positions. Consequently, with the three fixed contacts shown in the drawing, closure of the manually operated switch 27 changes the regulator from a four-step regulator to a two-step regulator.

By changing the gear ratio of the gears 26 or by adding additional seal-in contactors 25 driven by different gear ratio drives and controlled by other switches similar to 27, the regulator may go through its regulating range in any number of steps desired.

While we have shown and described a particular embodiment of our invention, it will be obvious to those skilled in the art that changes and modifications can be made therein and we therefore aim in the appended claims to cover all such changes and modifications as fall within the true spirit and scope of our invention.

What we claim as new and desire to secure by Letters Patent of the United States is:

1. In combination, a step regulator provided with a seal-in mechanism for introducing a predetermined number of regulating steps, and means for selectively modifying the action of said seal-in mechanism so as to obtain a different number of regulating steps.

2. In combination, a step regulator having a predetermined number of operating steps, a seal-in mechanism for causing said regulator to complete each operating step it commences, and means for selectively modifying the action of said seal-in mechanism so as to control how many operating steps will constitute a regulating step.

3. In combination, a step regulator having at least three positions, one of said positions being intermediate the other two, automatic driving means for said regulator, a set of seal-in contacts adapted to assume control of said driving means whenever said regulator is between adjacent positions, a second set of seal-in contacts adapted to assume control of said driving means whenever said regulator is between non-adjacent positions, and manually controlled means for selecting which of said sets of seal-in contacts will control said driving means.

4. In combination, an automatic step voltage regulator having a predetermined regulating range, and manually controlled means for selectively predetermining the number of regulating steps in said regulating range so as to control the relative fineness and coarseness of the regulation produced by said regulator.

5. In combination, an automatic voltage regulator of the transformer tap-changing type, said regulator having a plurality of contact-making tap switch positions, and means for selectively predetermining how many of said tap switch positions shall be included in a completed regulating step.

6. In combination, an automatic voltage regulator of the transformer tap-changing type, said regulator having a plurality of full cycle tap switch positions and a plurality of intermediate half-cycle tap switch positions, and means for selectively controlling whether said regulator can stop on any of said positions or only on said full-cycle positions.

7. In combination, a regulating transformer having a winding provided with a plurality of tap contacts, a tap-changing switch arm for successively engaging said contacts, said switch arm having intermediate positions when it bridges adjacent contacts, automatic driving means for said switch arm, a seal-in contactor driven by said mechanism for assuming control thereof when said switch arm is between adjacent engaging and bridging positions, a second seal-in contactor driven by said mechanism for assuming control thereof when said switch arm is between adjacent engaging positions, and means for selecting which of said contactors will control said driving mechanism.

8. In combination, an alternating current power circuit, a voltage regulating transformer for said circuit connected therein, said transformer having a plurality of tap contacts, a double finger tap-changing switch for cooperation with said contacts, said switch having full-cycle positions when both its fingers engage the same contact and half-cycle positions when its fingers engage adjacent taps, a reactor connected between the fingers of said switch, a connection between said circuit and the electrical midpoint of said reactor, means responsive to departure of the voltage of said circuit from a normal value for driving said switch in one direction or the other, a contactor operated by said driving means in such a way that it is closed at all times except when said switch is in a full-cycle position or a half-cycle position, a circuit controlled by said contactor for sealing-in said driving means, a second contactor operated by said driving mechanism in such a way that it is closed at all times except when said switch is in a full-cycle position, and a manually operated switch for connecting said second contactor in parallel with said first contactor.

SALVATORE MINNECI.
LOUIS F. BLUME.